United States Patent Office 2,914,490
Patented Nov. 24, 1959

2,914,490

RESINS FROM EPOXIDIZED POLYMERS AND POLYHYDRIC ALCOHOLS

Charles E. Wheelock, Bartlesville, Okla., assignor to Phillips Petroleum Company, a corporation of Delaware No Drawing. Application December 27, 1957
Serial No. 705,488

10 Claims. (Cl. 260—2)

This invention relates to resins from epoxidized polymers and polyhydric alcohols.

In my copending applications, Serial No. 612,890, filed September 28, 1956, and Serial No. 626,286, filed December 5, 1956, epoxidized diene polymers have been described. These epoxy compounds are those wherein an oxygen atom bridges adjacent carbon atoms, said carbon atoms being joined by a single valence bond. It is further disclosed therein that these polymers are useful as resins for varying uses such as laminating, casting, and coating compositions.

I have continued working with these resins in an attempt to provide greater usefulness. The present invention relates to a curing system which provides lower viscosity of the composition before cure and a reduction in the rate of cure of the composition in the presence of curing catalysts. This system provides compositions which are more easily handled since some of the epoxidized resins have quite high viscosity. The epoxidized liquid diene polymers cure quite slowly alone and I have heated portions of epoxidized liquid polybutadiene for as long as 92 hours before obtaining a Shore D hardness of 5. It was soon discovered that acidic and basic materials greatly increased the rate of cure and, for instance, immediate gelation can be obtained by mixing concentrated phosphoric acid with epoxidized liquid polybutadiene.

The following are objects of my invention:

An object of my invention is to provide thermosetting resins. A further object of this invention is to provide an improved curing system for epoxidized liquid polybutadiene. A further object of the invention is to provide a thermosetting composition more easily handled in that it has a lower viscosity before cure and has a reduced rate of cure.

Other objects and advantages of this invention will be apparent to one skilled in the art upon reading the accompanying disclosure.

The present invention is based upon the discovery of a method of curing an epoxidized liquid diene polymer containing 0.08 to 0.8 epoxy groups per aliphatic double bond originally present in the polymer comprising adding thereto an alcohol selected from the group consisting of polyhydric alcohols containing from 2 to 20 carbon atoms and polymers of compounds selected from the group consisting of ethylene oxide and propylene oxide having a molecular weight of 200 to 15,000, the amount of said alcohol being sufficient to provide 0.05 to 1.5 hydroxy groups per epoxy group in the epoxidized liquid diene polymer, and a catalyst selected from the group consisting of hydrochloric acid, sulfuric acid, phosphoric acid, boric acid, aluminum chloride, zinc chloride, ferric chloride, stannic chloride, titanium tetrachloride, cobalt chloride, nickel chloride, boron trifluoride, diethylenetriamine, triethylenetetraamine, sodium hydroxide, and potassium hydroxide, said catalyst being used in an amount of 1 to 10 percent based on the weight of said epoxidized liquid diene polymer, and heating the resulting mixture at a temperature in the range of 50 to 250° C. until a cured product is obtained.

Products prepared by this method exhibit good hardness and stability characteristics and are easily handled due to the low viscosity prior to cure.

When the epoxidized liquid polymer is prepared from a homopolymer of butadiene, the products are characterized in that the original unsaturated portion of the molecule is converted by the epoxidation reaction to units of which (1) 8 to 80 percent, preferably 13 to 50 percent, of said units are selected from the group consisting of

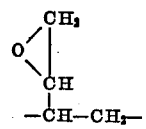

and

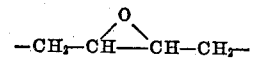

(2) up to 82 percent, preferably 50 to 77 percent, of said units are selected from the group consisting of

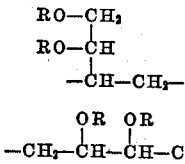

where R is selected from the group consisting of H and $$-\overset{O}{\underset{\|}{C}}-R_1$$

$R_1$ being an alkyl, aryl, alkaryl, or aralkyl group of one to 20 carbon atoms, and (3) 10 to 35 percent of said units are selected from the group consisting of

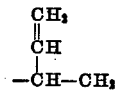

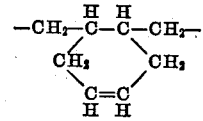

and

Of course, the present invention is not limited to these polymers but includes polymers, including copolymers, of dienes containing 4 to 6 carbon atoms, such as isoprene, piperylene, and 2,3-dimethyl-1,3-butadiene. Furthermore, other monomers can be used in preparing the copolymers such as styrene, substituted styrene, viny ethyl ether, acrylonitrile, methacrylonitrile, ethyl acrylate, and the like.

The liquid polymers can be prepared by any suitable method for preparing these including the use of sufficient amounts of mercaptan modifiers in emulsion polymerization systems to produce liquid polymers and by mass polymerization using finely divided alkali metal catalysts. A particularly preferred method is that described in Crouch 2,631,175. The products, following epoxidation, are preferably liquids having a viscosity up to 500,000 centipoises within the temperature range 0 to 100° C.

The alcohols which are blended with the epoxidized polymers are the aliphatic polyhydric alcohols, i.e., they contain two or more h: droxyl radicals. Of these, the liquids are especially suitable with regard to the aspect of lowering the viscosity of the epoxidized polymers. However, solid alcohols which can dissolve in the liquid polymer at temperatures below that employed for curing the product can be used advantageously and particularly so when employed in admixture with one or more liquid polyhydric alcohols.

Examples of suitable alcohols include 1,2-ethanediol (ethylene glycol), 1,2-propanediol (propylene glycol), 1,2-butanediol (butylene glycol), 2,3-butanediol, 1,3-propanediol (trimethylene glycol), 1,4-butanediol, 1,5-pentanediol, 1,2,3-propanetriol (glycerol), 1,2,3,4-tetrahydroxy butane (erythritol), 3-butene-1,2-diol, 2,2-dimethyl-1,3-propanediol, 1,4-dihydroxy-2-butene, 1,12-dihydroxyoctadecane, mannitol, and sorbitol.

Another group of polyhydric alcohols which are useful are polymers of ethylene oxide or propylene oxide or polymers of mixtures of these two materials. Solid polyethylene or polypropylene glycols can be used and a broad range of molecular weight is from 200 to 15,000. The liquid materials are preferred, these including polythylene glycols having a molecular weight of 200 to 700.

The alcohol-epoxidized liquid diene polymer blend can be mixed with thinners such as methyl isobutyl ketone, xylene, toluene, and carbon tetrachloride; with fillers such as sand, asbestos, crushed, powdered or fibrous glass, wood flour and clays; with pigments such as titanium dioxide and chromium pigments; and with various dyes. These and other essentially non-reactive materials can be selected by those skilled in the art and admixed for special effects.

A catalyst is used to modify the rate of cure. Particularly suitable catalysts comprise acidic reagents such as the inorganic acids and salts of some polyvalent metals. Acidic catalysts especially suitable are sulfuric acid, phosphoric acid, boric acid, aluminum chloride, zinc chloride, ferric chloride, stannic chloride, titanium tetrachloride, cobalt chloride, nickel chloride and boron trifluoride.

However, basic catalysts such as the primary and secondary amines, including, for example, diethylenetriamine and triethylenetetraamine; lime; sodium hydroxide and potassium hydroxide; can be used.

The concentration and type of catalyst can be varied depending upon the individual conditions. In general, concentrations from 0.1 to 10 percent by weight of epoxidized polymer are used. The catalyst can be added as a suspension or solution, if desired, to facilitate handling and mixing. As is well known to those skilled in the art, it will be generally preferred to add the catalyst just prior to application.

The conditions of cure can depend upon the end use as well as the composition of the resin. The epoxidized polymers when admixed with acid catalysts can set to a gel at room temperatures (20-30° C.) within a minute or two. By addition of at least one of the polyhydric alcohols this gelation can be delayed so that brushing or spraying of the mixture is possible. The alcohol-polymer blends are thermoset at temperatures in the range of 50 to 250° C. The temperature during the initial stages of cure should not be increased so rapidly that excessive alcohol is lost by volatilization. This effect can be minimized by maintaining a closed system or by application of pressure during cure.

The length of cure will depend upon the resin composition. At high temperatures (100-250° C.) satisfactory cure can be frequently achieved within one or two hours, but prolonged cure (e.g. several hundred hours) can be applied to obtain an increase in the hardness of the resin.

Liquid polybutadiene, prepared according to the method of Crouch 2,631,175 and having a viscosity of about 1500 Saybolt Furol seconds at 100° F. and an unsaturation of 80 percent of theoretical, e.g., 0.8 double bonds per $C_4$ unit, was stripped in a batch operation by flushing for 45 minutes with nitrogen at a temperature of 190° to 200° C. and at a pressure of 10 to 20 mm. Hg absolute. This polymer was epoxidized by dissolving 432 grams of the polymer in two liters of chloroform to which was added 280 grams of a nuclear sulfonated ion exchange resin (Amberlite IR-120) in the acid form and 35 mls. of glacial acetic acid. The temperature was 43° C. To this mixture there was added 266 grams of 50 percent hydrogen peroxide over a period of 30 to 40 minutes while maintaining the temperature at 43° C. The mixture was stirred for 2.5 hours at this temperature. The ion exchange resin was removed by filtration. Then 500 milliliters of water were added, the aqueous phase was removed, and the polymeric product washed several times with dilute aqueous sodium bicarbonate and then with water. The neutral organic phase was dried over anhydrous sodium sulfate and the solvent was stripped by warming under vacuum.

The thus prepared epoxidized polymer was then analyzed for epoxy oxygen content and total oxygen content. Epoxy oxygen content was determined by the hydrochloric acid-dioxane method given in Organic Analysis, Mitchell et al., volume 1, pages 135-136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

Several batches of the polymer were prepared according to the above method and blended. Analysis of this blend showed it to contain 5.4 percent by weight of oxirane oxygen, 1.9 percent by weight hydroxyl oxygen and a total oxygen content of 9.3 percent on the same basis. Approximately 21 percent of the total oxygen was hydroxyl oxygen. The product had a viscosity of over 400,000 centipoises at room temperature.

EXAMPLE I

The epoxidized polymer was mixed with 98 percent glycerol and with phosphoric acid as reported in Table I. In the absence of glycerol, rapid gelation precludes measurement of the viscosity. The viscosities of the blends reported in Table 1 were measured with a Brookfield viscosimeter with a No. 7 spindle at room temperature.

These results demonstrate that compositions can be maintained sufficiently fluid to permit convenient application in laminates, etc., and that the addition of the polyhydric alcohol decreases the viscosity.

*Table 1*

| Run No. | Grams per 100 grams of polymer | | Viscosity, cps., after— | | |
|---|---|---|---|---|---|
| | Glycerol[a] | Phosphoric Acid[b] | 5 min. | 10 min. | 60 min. |
| 1 | 6 | 0 | 78,000 | | |
| 2 | 6 | 0.4 | 92,000 | 96,000 | |
| 3 | 6 | 2.0 | 88,000 | | 157,200 |
| 4 | 6 | 2.8 | 100,000 | 134,400 | 148,000 |
| 5 | 6 | 4.0 | 96,000 | | |
| 6 | 9 | 4.0 | 86,400 | 102,400 | 168,000 |
| 7 | 12 | 4.0 | 66,800 | 90,800 | 163,600 |

[a] The weight given is for 98% glycerol.
[b] The weight given is for 85% $H_3PO_4$.

EXAMPLE II

The epoxidized polymer was blended with glycerol, triethylene glycol or polyethylene glycol in amounts as shown in Table 2. The polyethylene glycol used for these tests was a commercial product described as having an average molecular weight of about 200.

The polyhydroxy compound was first mixed with the epoxidized polymer and the catalyst was added last. The blends were then poured into aluminum dishes and cured at 100° C. The Shore D hardness at room temperature was periodically measured. The results presented in Table 2 show that hard structures can be produced within an hour or two when acid catalysts are used. In the absence of catalysts, as for the first test in this table, the mixture remained fluid for the duration of the test period (93 hours).

Table 3

| Resin Composition | | | Cure at 150° C., hours | Flexural strength, p.s.i. |
|---|---|---|---|---|
| Polymer | Glycerol | Phosphoric acid | | |
| 100 | 3 | 2 | 24 | 41,500 |
| 100 | 3 | 2 | 37 | 42,300 |
| 100 | 3 | 2 | 48 | 34,700 |
| 100 | 9 | 2 | 24 | 60,100 |
| 100 | 9 | 2 | 37 | 52,100 |
| 100 | 9 | 2 | 48 | 59,100 |
| 100 | 12 | 2 | 24 | 42,300 |
| 100 | 12 | 2 | 37 | 37,000 |
| 100 | 12 | 2 | 48 | 60,100 |

As many possible embodiments can be made of this

Table 2
CURING OF EPOXIDIZED POLYMER-GLYCOL MIXTURES AT 100° C.

| Parts by Weight per 100 parts of epoxidized polymer | | | | | | | Shore D hardness after— | | | | | | |
|---|---|---|---|---|---|---|---|---|---|---|---|---|---|
| Glycerol | Triethylene glycol | Polyethylene glycol | 85% Phosphoric acid | 95% Sulfuric acid | Stannic chloride reagent* | Diethylene triamine | 0.5 hr. | 1.5 hr. | 2 hr. | 3.5 hr. | 18 hr. | 20 hr. | 45 hr. | 93 hr. |
| 6 | 0 | 0 | 0 | 0 | 0 | 0 | Liquid | | | | | | | |
| 6 | 0 | 0 | 0.4 | 0 | 0 | 0 | | | | | | 4 | 5 | Liquid |
| 6 | 0 | 0 | 2.0 | 0 | 0 | 0 | 6 | 15 | | 20 | | 35 | 45 | 7 |
| 6 | 0 | 0 | 2.8 | 0 | 0 | 0 | 12 | 25 | | 27 | | 60 | 65 | 65 |
| 6 | 0 | 0 | 4.0 | 0 | 0 | 0 | 25 | 50 | | 52 | | 74 | 76 | 80 |
| 3 | 0 | 0 | 4.0 | 0 | 0 | 0 | 21 | 31 | | 31 | | 55 | 65 | 80 |
| 9 | 0 | 0 | 4.0 | 0 | 0 | 0 | 11 | 32 | | 40 | | 73 | 80 | 70 |
| 12 | 0 | 0 | 4.0 | 0 | 0 | 0 | 6 | 31 | | 35 | | 74 | 80 | 80 |
| 3 | 0 | 0 | 0 | 0 | 0 | 0.73 | | | | | | | | 3 |
| 3 | 0 | 0 | 0 | 0 | 0 | 1.46 | | | | | | | 3 | |
| 3 | 0 | 0 | 0 | 0 | 0 | 2.19 | | | | | | | 10 | |
| 3 | 0 | 0 | 0 | 1.2 | 0 | 0 | | | | | 18 | | | |
| 3 | 0 | 0 | 0 | 2.4 | 0 | 0 | | | | | 60 | | | |
| 3 | 0 | 0 | 0 | 3.7 | 0 | 0 | | | | | 60 | | | |
| 0 | 3 | 0 | 4.0 | 0 | 0 | 0 | | | 40 | 46 | | 70 | 71 | 80 |
| 0 | 6 | 0 | 4.0 | 0 | 0 | 0 | | | 31 | 40 | | 60 | 70 | 75 |
| 0 | 9 | 0 | 4.0 | 0 | 0 | 0 | | | 30 | 40 | | 66 | 70 | 75 |
| 0 | 12 | 0 | 4.0 | 0 | 0 | 0 | | | 45 | 50 | | 61 | 65 | 70 |
| 0 | 0 | 3 | 4.0 | 0 | 0 | 0 | | | 50 | 60 | | 75 | 75 | 80 |
| 0 | 0 | 6 | 4.0 | 0 | 0 | 0 | | | 37 | 45 | | 65 | 70 | 75 |
| 0 | 0 | 9 | 4.0 | 0 | 0 | 0 | | | 35 | 40 | | 65 | 71 | 75 |
| 0 | 0 | 12 | 4.0 | 0 | 0 | 0 | | | 26 | 32 | | 55 | 70 | 70 |
| 0 | 0 | 0 | 0 | 0 | 3.46 | 0 | 30 | 36 | | 55 | | 65 | 65 | 70 |
| 0 | 0 | 0 | 0 | 0 | 3.46 | 0 | 25 | 30 | | 40 | | 62 | 65 | 65 |
| 0 | 0 | 0 | 0 | 0 | 3.46 | 0 | 25 | 32 | | 35 | | 55 | 56 | 60 |
| 0 | 0 | 0 | 0 | 0 | 3.46 | 0 | 25 | 26 | | 35 | | 45 | 50 | 53 |
| 0 | 3 | 0 | 0 | 0 | 3.46 | 0 | 26 | 33 | | 45 | | 55 | 55 | 60 |
| 0 | 6 | 0 | 0 | 0 | 3.46 | 0 | 32 | 35 | | 46 | | 57 | 60 | 65 |
| 0 | 9 | 0 | 0 | 0 | 3.46 | 0 | 24 | 25 | | 41 | | 65 | 63 | 70 |
| 0 | 12 | 0 | 0 | 0 | 3.46 | 0 | 25 | 25 | | 30 | | 45 | 55 | 55 |

*The values given are for a saturated solution of stannic chloride dihydrate in triethylene glycol.

EXAMPLE III

Laminates were prepared using 12 plies each of nested Owens-Corning ECC–181–136, a Fiberglas cloth. The epoxidized polymer was prepared in the same manner as previously described but had an oxirane oxygen content of 6.3 percent and a total oxygen content of 9.7 percent.

The cloth had been washed with water and dried at 160° C. for 20 hours. The nested, fill threads parallel, panels were impregnated one at a time by puddle and spatula application and pressed in a stainless steel mold using different amounts of glycerol and 85 percent phosphoric acid in the epoxidized liquid polybutadiene. The laminates were 6 inches by 3 inches by ⅛ inch and about 160 grams of resin mixture were used. The data are reported in Table 3, amounts being given in parts by weight.

After curing the laminates at 150° C., test specimens were cut which were 0.625 inch wide by about 3 inches long. The flexural strength was determined in accordance with Federal Specification L–P–406b Method 1031 (September 27, 1951).

These data show that laminates having exceptionally high strength can be produced with the compositions herein disclosed.

invention without departing from the scope thereof, it is to be understood that all matter herein set forth is to be interpreted as illustrative and not as unduly limiting the invention.

I claim:

1. A thermosetting resin comprising a mixture of an epoxidized liquid diene polymer containing 0.08 to 0.8 expoxy groups per aliphatic double bond originally present in the polymer and an alcohol selected from the group consisting of aliphatic polyhydric alcohols containing from 2 to 20 carbon atoms and polymers of compounds selected from the group consisting of ethylene oxide and propylene oxide having a molecular weight of 200 to 15,000, the amount of said alcohol being sufficient to provide 0.05 to 1.5 hydroxy group per epoxy group in the epoxidized liquid diene polymer and a catalyst selected from the group consisting of hydrochloric acid, sulfuric acid, phosphoric acid, boric acid, aluminum chloride, zinc chloride, ferric chloride, stannic chloride, titanium tetrachloride, cobalt chloride, nickel chloride, boron trifluoride, sodium hydroxide, and potassium hydroxide, said catalyst being used in an amount of 1 to 10 percent based on the weight of said epoxidized polymer.

2. A thermosetting resin comprising a mixture of epoxidized liquid polybutadiene containing 0.08 to 0.8 epoxy groups per aliphatic double bond originally present in the polymer and an alcohol selected from the group consisting of aliphatic polyhydric alcohols containing from 2 to 20 carbon atoms and polymers of compounds selected from the group consisting of ethylene oxide and propylene oxide having a molecular weight of 200 to 15,000, the amount of said alcohol being sufficient to provide 0.05 to 1.5 hydroxy group per epoxy group in the epoxidized liquid polybutadiene and a catalyst selected from the group consisting of hydrochloric acid, sulfuric acid, phosphoric acid, boric acid, aluminum chloride, zinc chloride, ferric chloride, stannic chloride, titanium tetrachloride, cobalt chloride, nickel chloride, boron trifluoride, sodium hydroxide, and potassium hydroxide, said catalyst being used in an amount of 1 to 10 percent based on the weight of said epoxidized polymer.

3. A thermosetting resin comprising a mixture of epoxidized liquid polybutadiene containing 0.08 to 0.8 expoxy groups per aliphatic double bond originally present in the polymer, ethylene glycol, and concentrated hydrochloric acid.

4. A thermosetting resin comprising a mixture of epoxidized liquid polybutadiene containing 0.08 to 0.8 epoxy groups per aliphatic double bond originally present in the polymer, glycerol, and phosphoric acid.

5. A thermosetting resin comprising a mixture of epoxidized liquid polybutadiene containing 0.08 to 0.8 epoxy groups per aliphatic double bond originally present in the polymer, glycerol, and sulfuric acid.

6. A thermosetting resin comprising a mixture of epoxidized liquid polybutadiene containing 0.08 to 0.8 epoxy groups per aliphatic double bond originally present in the polymer, triethylene glycol, and phosphoric acid.

7. A thermosetting resin comprising a mixture of epoxidized liquid polybutadiene containing 0.08 to 0.8 epoxy groups per aliphatic double bond originally present in the polymer, polyethylene glycol having a molecular weight in the range of 200 to 700 and phosphoric acid.

8. A thermosetting resin comprising a mixture of epoxidized liquid polybutadiene containing 0.08 to 0.8 epoxy groups per aliphatic double bond originally present in the polymer, polyethylene glycol having a molecular weight in the range of 200 to 700, and stannic chloride.

9. A thermosetting resin comprising a mixture of epoxidized liquid polybutadiene containing 0.08 to 0.8 epoxy groups per aliphatic double bond originally present in the polymer, triethylene glycol and stannic chloride.

10. A method of curing an epoxidized liquid diene polymer containing 0.08 to 0.8 epoxy groups per aliphatic double bond originally present in the polymer comprising adding thereto an alcohol selected from the group consisting of polyhydric alcohols containing from 2 to 20 carbon atoms and polymers of compounds selected from the group consisting of ethylene oxide and propylene oxide having a molecular weight of 200 to 15,000, the amount of said alcohol being sufficient to provide 0.05 to 1.5 hydroxy groups per epoxy group in the epoxidized liquid diene polymer and a catalyst selected from the group consisting of hydrochloric acid, sulfuric acid, phosphoric acid, boric acid, aluminum chloride, zinc chloride, ferric chloride, stannic chloride, titanium tetrachloride, cobalt chloride, nickel chloride, boron trifluoride, sodium hydroxide, and potassium hydroxide, said catalyst being used in an amount of 1 to 10 percent based on the weight of said epoxidized liquid diene polymer, and heating the resulting mixture at a temperature in the range of 50 to 250° C. until a cured product is obtained.

References Cited in the file of this patent

UNITED STATES PATENTS 2,731,444     Greenlee _____ Jan. 17, 1956